CLEANING AND COATING FISHING LINE

FIELD OF INVENTION

This invention relates to fishing equipment and more particularly to means for cleaning and waterproofing fly lines.

BACKGROUND OF INVENTION

Since fishermen first began using long, relatively limber fishing rods with floating lines and artificial flys attached to the end thereof, a problem has been encountered with keeping the lines adequately waterproofed or "waxed" to prevent the same from sinking which, should such occur, will prevent or greatly hinder normal use of the equipment.

Additionally, fly lines are susceptible to becoming coated with surface scum since the line is supported by the surface tensioning of the water or at least floats on the surface thereof rather than being submerged as cast lines normally are.

To clean the fly line of surface scum and other accumulations and to wax the same to assure proper floating, a combination cleaner and wax compound is almost universally used. This cleaner and wax usually comes in a relatively thin container having a diameter approximating that of a silver dollar. A felt patch is also usually provided which is thoroughly impregnated with the cleaner and wax. Such patch is then folded over the line and it is pulled therethrough. This process is laborious in that the patch must be reimpregnated periodically and the position of the patch must be changed every few feet because of the accumulation of dirt thereon. Since this cleaning and waxing process must be repeated numerous times during the fishing season, it becomes a laborious, burdensome task that must be endured if the fly line is to perform properly.

After much research and study into the above-mentioned problems, the present invention has been developed to provide a simple, inexpensive and yet highly efficient method of cleaning and waxing fly type fishing lines. This invention eliminates the necessity of the fisherman having to pull the felt patch during application of the cleaner and wax to the line thus eliminating the clean-up normally required to remove the sticky waxy compound from the hands of the user thereof.

The above is accomplished through the impregnation of a porous material with the cleaning and waxing compound and rotatively mounting the same within a cylinder having at least one waxing slot therein. If the fly line is pulled through the slot with the cover thereover, such line need not be touched by the person applying the wax during the entire cleaning and waxing operation. Since the compound impregnated member can be rotated within the slotted container, new surfaces can readily be exposed to the line during the application process.

In view of the above, it is an object of the present invention to provide an improved line cleaner and waxer.

Another object of the present invention is to provide a line cleaning and waxing device which is simple to operate and highly efficient in results.

Another object of the present invention is to provide a line treating means which allows for presentation of virgin surface to such line.

Another object of the present invention is to provide a means for cleaning and waxing a fly type fishing line without contaminating the hands of the user thereof.

Another object of the present invention is to provide a really openable and closeable means for waxing fly type fishing lines.

Another object of the present invention is to provide a means for cleaning and waxing a line without opening the container within which the compound is disposed.

Another object of the present invention is to provide a fly line type cleaner and wax applicator having a rotatable member within a sleeve-like container.

Other objects and advantages of the present invention will become apparent and obvious from a study of the following description and the accompanying drawings which are merely illustrative of such invention.

DETAIL DESCRIPTION OF INVENTION

Figure 3:
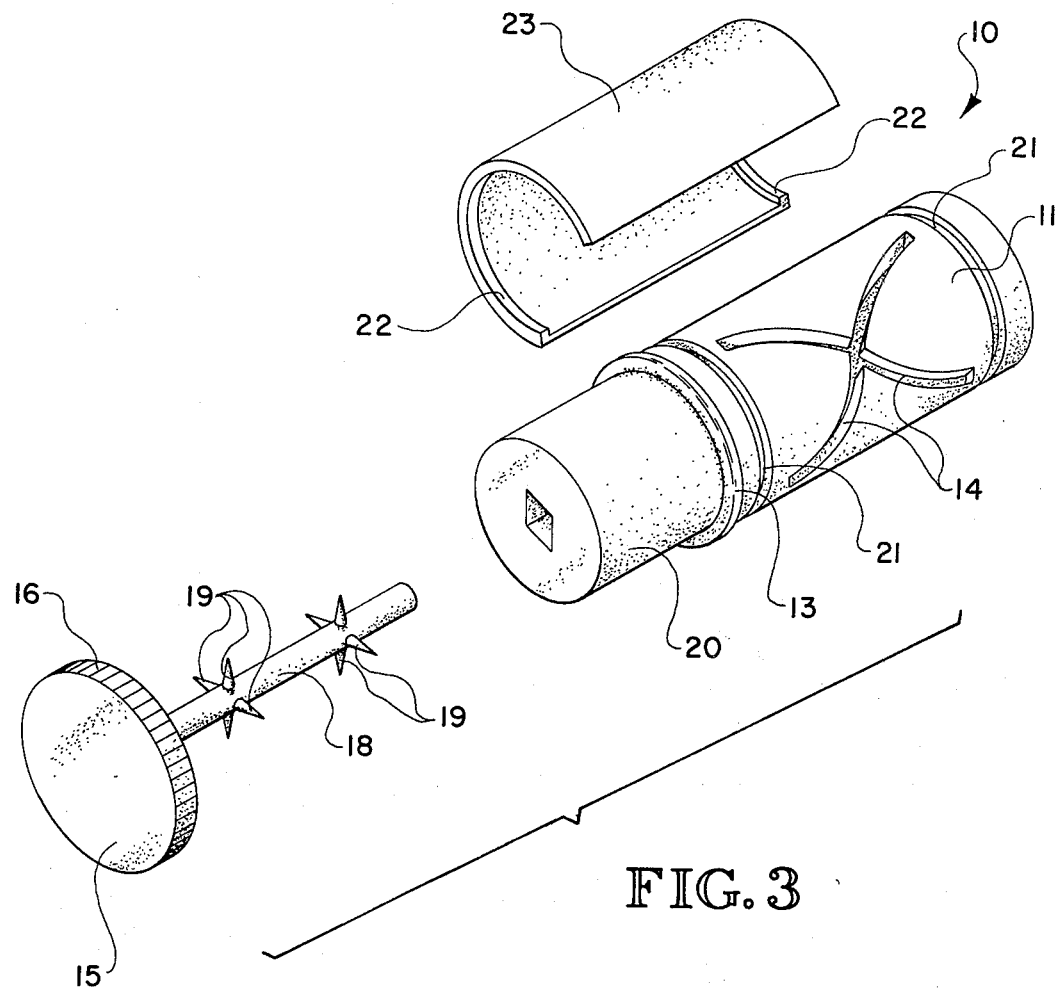
FIG. 3 is an exploded view showing the various parts of the present invention.
Figure 1:
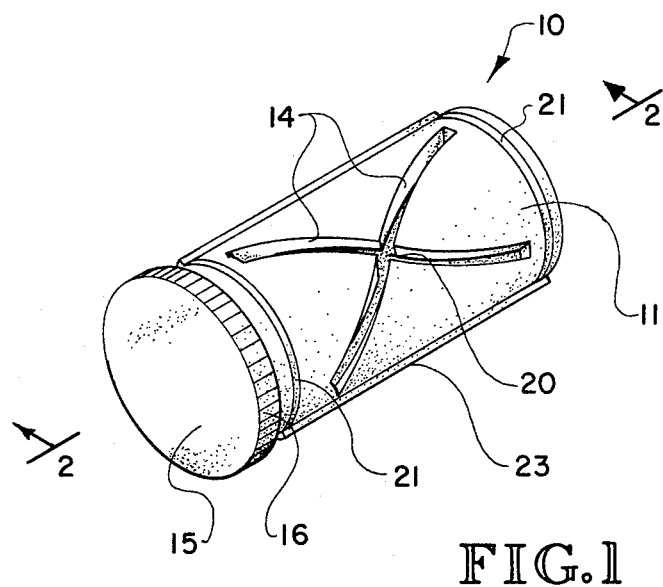
FIG. 1 is a perspective view of the cleaner and waxer of the present invention.
Figure 2:
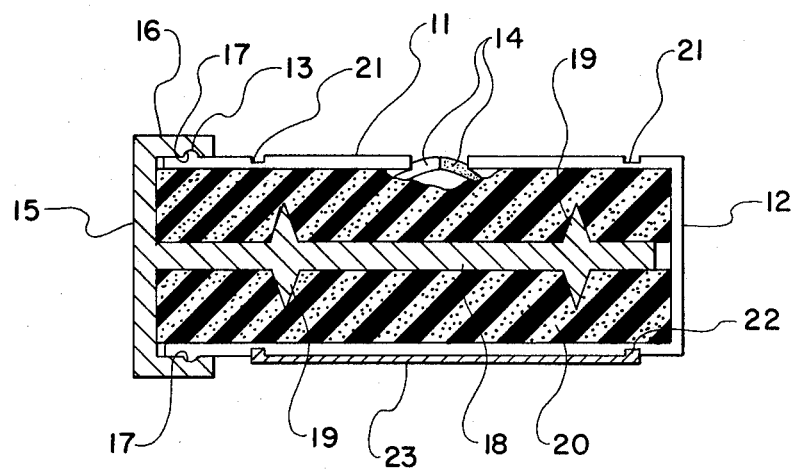
FIG. 2 is a sectional view taken through lines 2—2 of FIG. 1.
Figure 3:
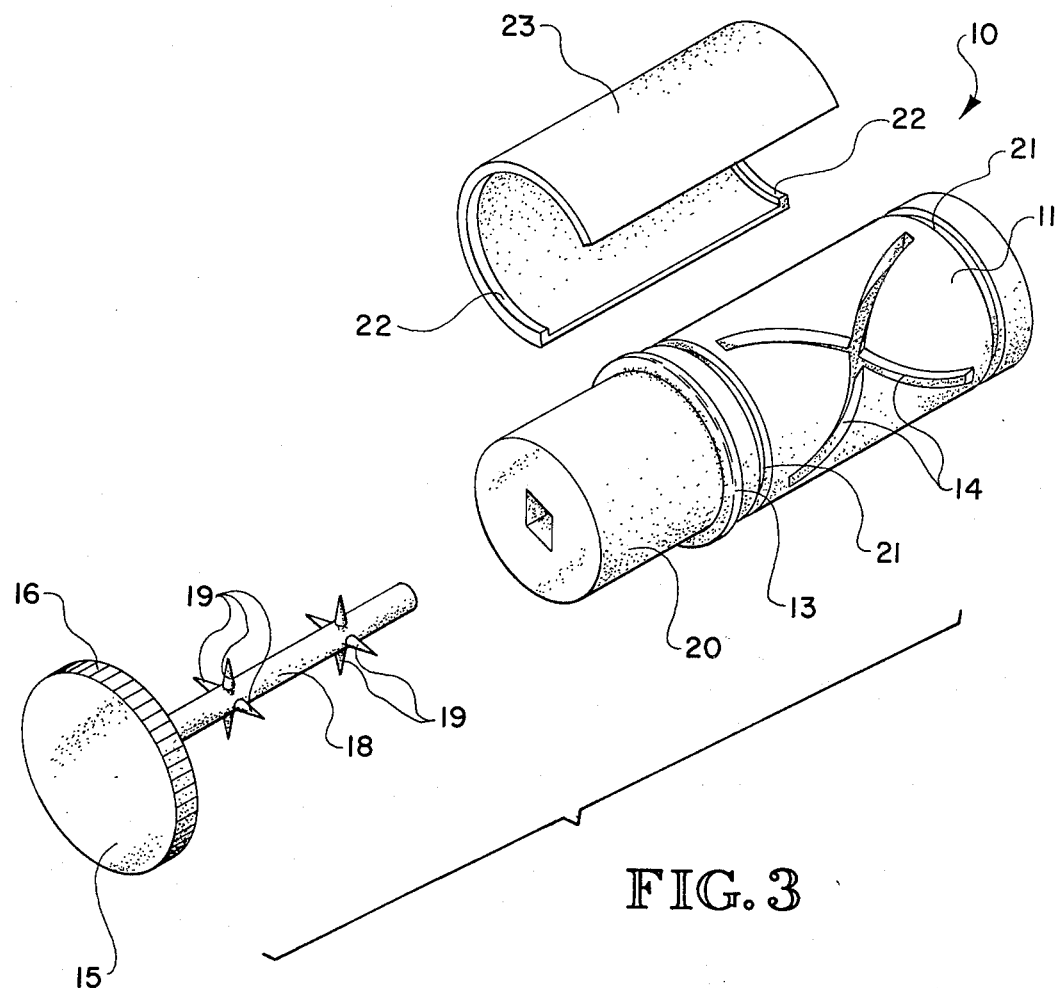

With further reference to the drawings, the cleaning and waxing device of the present invention, indicated generally at 10, includes a generally sleeve shaped housing 11 having an enclosed end portion 12.

About the exterior of housing 11, opposite end portion 12, is an integral retaining ring 13 whose purpose will hereinafter be set forth in greater detail.

Slots or openings 14 are provided and are so sized as to receive a fly type fishing line or similar means to be treated. Although a plurality of slots are shown in the Figures, it is understood that only one could be provided if so desired. Also the slots are preferably angularly disposed to the longitudinal length of housing 11 so that as the interior treating medium is moved within the housing, new surfaces can be readily exposed as hereinafter set forth. Finally the angle or bias of the slots across the surface of housing 11 aids in the pulling of the line through the slot during the cleaning/waxing process.

A cap 15 is provided which includes a skirt portion 16. This cap is adapted to fit over the open end of housing 11 adjacent retaining ring 13. The interior of skirt 16 includes a depression 17 adapted to retaingly engage ring 13 of housing 11. Since the cap 15 and its associated skirt 16 are preferably made from a resilient material, such cap can be snapped onto retaining ring 13 and when in such position can be rotated relative to housing 11.

Fixedly secured to the central portion of cap 15 and extending axially into housing 11 (when the cap and housing are snapped together) is a medium supporting rod 18. A plurality of spike-like projections 19 are provided intermediately on rod 18 to grippingly retain the cleaner and waxer impregnated medium 20.

This medium, which is mounted on rod 18 and supported by cap 15, can be composed of any suitable porous material such as sponge rubber, fibrous material or the like.

The porous material or medium 20 is formed about or otherwise disposed on shaft 18 with spikes 19 assuring a fixed relationship therebetween. The medium or application 20 is thoroughly impregnated with the desired cleaning and waxing compound and the same is inserted into cylindrical housing 11 until skirt slot 17 of cap 15 engages retaining ring 13 of housing 11. When cap 15 is thus engaged, it can be rotated relative to housing 11 which will turn the medium 20 relative to the cleaning slot or slots 14.

A pair of grooves 21 are provided in the exterior of housing 11, one adjacent each end thereof. Each of these grooves are adapted to slidingly receive a shoulder 22 which is formed at each end of semi-cylindrical cover 23. Thus it can be seen that once cover 23 is snapped onto housing 11, it lies juxtaposed thereto and can be rotated thereabout covering an uncovering slots 14 as desired.

Once the device of the present invention has been appropriately impregnated and assembled, it is ready for use by fishermen or other persons having a need for a device of this type.

The cover 23 is rotated around housing 11 until slots 14 are exposed. A line can then be placed in one of such slots and pulled longitudinally through the same which causes such line to slidingly engage the medium 20 contained within the housing 11. This longitudinal sliding of the line against the medium cleans the same and applies a wax coating thereto.

Once the medium below the slot being used gets dirty and tends to become depleted of coating wax, cap 15 can be rotated slightly relative to housing 11 thus exposing an unused portion of medium 20 to slot 14.

Although not absolutely necessary for appropriate operation of the present invention, slots in two different directions have been shown so that once the medium has been used all the way around through one slot, use of the second slot will cross the original soiled areas at an angle thus providing enough unused surface to continue adequately cleaning and waxing the line.

Also it should be kept in mind that when the medium 20 is completely impregnated, the cleaning and waxing compound will revitalize the surface of the medium after use thus providing a long-lasting cleaning device which can be used by fishermen for several seasons before replacement becomes necessary.

From the above, it can be seen that the present invention provides a simple to operate, relatively inexpensive cleaner and wax applicator for fly lines or the like which is long-lasting and eliminates the grease and mess which has heretofore been necessary to accomplish the desired result. The present invention is further attractive in appearance and is easily stored in a tackle box or other location when not in use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A cleaning and coating device for line type means comprising:
   a generally sleeve shaped housing;
   a generally cylindrical shaped fixed applicator disposed within said housing;
   said applicator being a resiliant, porous mass impregnated with the coating material;
   at least one slot means communicating through the peripheral wall of said housing whereby when said line is pulled longitudinally along said slot and in contact with the impregnated resilient mass, said cleaning and coating will be effected; and
   means for rotatably adjusting said applicator within the housing in order to present a fresh applicator surface at the slot opening.

2. The device of claim 1 wherein said sleeve shaped housing is closed at one end.

3. The device of claim 1 wherein the means for rotating said applicator within said housing is a housing end cap fixedly secured to said applicator and rotatively mounted on said housing.

4. The device of claim 3 wherein a plurality of slots are provided in said housing.

5. The device of claim 1 wherein said slots are disposed in criss-cross fashion whereby more complete exposure of said line to said applicator can be accomplished.

6. The device of claim 5 wherein a cover means is provided for said slot in said housing.

7. The device of claim 6 wherein said cover is of the snap-on type.

* * * * *